United States Patent [19]

McMillen

[11] Patent Number: 5,231,539
[45] Date of Patent: Jul. 27, 1993

[54] NODAL-POINT ADJUSTING RETROREFLECTOR PRISM AND METHOD

[75] Inventor: David A. McMillen, St. Paul, Oreg.

[73] Assignee: Norita Precision, Inc., Portland, Oreg.

[21] Appl. No.: 826,446

[22] Filed: Jan. 27, 1992

[51] Int. Cl.⁵ ............................................. G02B 5/122
[52] U.S. Cl. .................................... 359/529; 359/515; 359/876; 33/279; 33/293
[58] Field of Search ............... 359/529, 527, 515, 831, 359/833, 834, 872, 876; 33/279, 293, 296, 299; 356/5, 138, 139, 247

[56] References Cited

U.S. PATENT DOCUMENTS

| | | | |
|---|---|---|---|
| 3,748,026 | 7/1973 | Scholdstrom | 359/831 |
| 4,470,664 | 9/1984 | Shirasawa | 359/529 |
| 4,519,674 | 5/1985 | Buckley et al. | 359/529 |
| 4,688,937 | 8/1987 | König et al. | 356/153 |
| 4,875,291 | 10/1989 | Panique et al. | 33/293 |
| 4,970,794 | 11/1990 | Buckley | 33/293 |

OTHER PUBLICATIONS

Hanada, "Coinciding the Optical Center with the Center of Gravity in a Corner Cube Prism: A Method," *Appl. Optics* 27:3530-3533 (1988).

*Primary Examiner*—Loha Ben
*Attorney, Agent, or Firm*—Klarquist, Sparkman, Campbell, Whinston & Leigh

[57] ABSTRACT

Methods and apparatuses are disclosed for setting the nodal point of a retroreflector such as a corner-cube prism. The apparatuses permit rotation of the retroreflector about a stationary first pivot axis and motion of the retroreflector along its optical axis relative to the first pivot axis, wherein the first pivot axis is perpendicular to the optical axis. Methods comprise using the retroreflector to produce a reflected image of a stationary reference object, and pivoting the retroreflector about the first pivot axis and moving the retroreflector along the optical axis to a position at which the reflected image remains stationary as the retroreflector is pivoted. Thus, the retroreflector is adjusted so as to produce a reflected beam that is exactly parallel to a corresponding incident beam even when the optical axis of the prism is not exactly parallel with the propagation vector of the incident beam. The prism can optionally be additionally pivoted about at least a second pivot axis to facilitate alignment with a remote light source.

18 Claims, 2 Drawing Sheets

NODAL-POINT ADJUSTING RETROREFLECTOR PRISM AND METHOD

FIELD OF THE INVENTION

The present invention relates to optical systems elements. In particular, it relates to optical reflectors that are placed apart from distance-measuring instruments that transmit electromagnetic impulses to the reflectors for reflection back the instruments.

BACKGROUND OF THE INVENTION

In the last two decades, surveying instruments have undergone a substantial evolution, particularly to meet the demands of increasing accuracy and ease of use. For example, distances are now routinely measured very accurately using an electronic distance meter (EDM). An EDM transmits a pulsed light beam (generally a coherent beam of near-infrared light) to a distant target. A "retroreflector" is placed at the target to return the beam back to the EDM. A retroreflector is a device capable of causing reflected radiation to return along paths substantially parallel to the paths of the corresponding incident radiation. Some conventional EDMs measure distances by accurately measuring the elapsed time between the instant the pulsed light beam left the EDM and the instant the beam returned to the EDM after being reflected from the retroreflector, then electronically computing half the distance traversed by the beam. Since light travels through the atmosphere at a substantially constant known velocity, the distance traveled by the light beam can be readily calculated from the time measurement. Most types of EDMs measure the phase shift of the returning beam relative to the transmitted beam and compute the traversed distance from that information.

Another key evolutionary step has been the integration of a highly accurate angle-measuring device (theodolite) with an EDM to form what is known in the art as a "total station."

Before the advent of the total station, EDMs were generally used either alone or mounted piggyback on top of a theodolite. The piggyback configuration was usually used with a retroreflector and separate theodolite target that had to be carefully spaced apart to avoid possible measurement discrepancies due to convergence. Total stations, in contrast, are coaxial in that the theodolite and EDM "axes" are coincident. With a total station, the center of the retroreflector serves as the reference point for all angle and distance measurements, thus eliminating the need for a separate theodolite target.

A preferred retroreflector for use with an EDM or with a total station is a "corner-cube prism." A conventional corner-cube prism is made from a solid cylindrical piece of optical glass. The prism has a "face": a circular planar surface, normally facing the EDM, that is perpendicular to the longitudinal axis ("optical axis") of the prism. The optical axis passes through the center of the face. The rear of the prism is configured as a pyramid having three facets perpendicular to each other and equiangular to the optical axis so as to form an apex on the optical axis opposite the face. Since the three facets, relative to the face of the prism, are situated at angles greater than the "critical angle," an incident light beam entering the prism through the face is internally reflected off each of the prism sides so as to exit the prism through the face.

A corner-cube prism is typically encased in a protective enclosure (or "canister"). The canister is mounted on a tripod or surveyor's prism pole used to hold the prism stationary during use. The tripod or pole is typically configured to allow the prism elevation to be adjusted and the prism to be leveled. The axis of the pole or tripod, referred to herein as a "target axis," is typically oriented vertically so as to enter the earth at the "target point" (i.e., the point having a distance from the EDM that is to be measured).

The accuracy of distance measurements performed using an EDM and retroreflector is dependent mainly upon the electronic accuracy of the EDM and on the position of the retroreflector relative to the target axis. A light beam, transmitted from an EDM to a retroreflector, requires a certain amount of time to travel the distance from the EDM to the retroreflector and back again. For "elapsed time" EDMs, that time increment should represent very accurately the actual distance from the EDM to the target axis. Similarly, the magnitude of the phase shift experienced by a light beam traveling from a "phase shift" EDM to a retroreflector and back again should also represent very accurately the actual distance from the EDM to the target axis. However, because the prism refracts light (i.e., light travels more slowly through the prism glass than through air), a discrepancy can be imparted to the distance calculation displayed by the EDM. This discrepancy can be significant, particularly if the prism were mounted on the tripod or pole with the prism apex situated on the target axis (which some persons skilled in the art regard as the "correct" position for the prism). The slower velocity of light in glass, relative to the velocity of light in air, is quantitatively indicated by the index of refraction of the prism glass. For example, with typical prisms having an index of refraction of 1.509, the distance traveled by the light beam inside the prism multiplied by 1.509 is equal to the distance the beam would have traveled in the same amount of time in air. The difference of these two distances is the amount of discrepancy that would result in a distance measurement if the apex of the prism were placed on the target axis. Manufacturers of conventional corner-cube prisms attempt to compensate for this error by mounting the prism a distance away from the target axis toward the EDM equal to the computed distance difference. This displacement of the prism relative to the target axis is conventionally termed the "zero offset" position.

Ideally, a retroreflector should produce a reflected light beam that is exactly parallel to the incident beam, even when the incident beam is not exactly parallel to the optical axis of the retroreflector. This is particularly desirable whenever the retroreflector is located a long distance from the EDM. Corner-cube prisms inherently have the capability of producing a parallel reflected beam. But, when a corner-cube prism is adjusted relative to the target axis to have "zero offset", it virtually never produces a reflected beam that is exactly parallel to the incident beam except when the incident beam is parallel to the optical axis of the prism. As a result, extremely accurate alignment of the optical axis of the prism with the propagation vector of the incident beam is required to ensure that the reflected beam returns to the EDM. Performing this alignment under field-use conditions is very difficult and time-consuming.

U.S. Pat. No. 3,748,026 to Scholdstrom discloses equations that define, for a particular corner-cube prism, the position of a "pivot axis" intersecting the optical axis of the prism between the base and apex of the prism. The equations are derived from certain relationships purportedly applicable for minimizing distance measurement discrepancies that would arise if the optical axis of the prism were excessively misaligned relative to the incident light beam. According to Scholdstrom, the pivot axis actually represents one end of the distance to be measured; i.e., the prism should be positioned on a mounting such that the pivot axis crosses the target point. However, this reference does not disclose how the pivot axis for a particular prism can be determined other than mathematically. Of course, the results of such calculations will be different for different prisms. Also, such calculations cannot practicably be performed in the field.

Different prism manufacturers apply different amounts of offset to their prisms in accordance with conventional theory and with their respective different opinions as to what the optimal offset should be. Thus, fitting a first manufacturer's prism to a second manufacturer's prism mounting typically changes the prism's offset by an unknown amount, leading to distance measurement discrepancies. This is a problem in the field because most surveyors use equipment made by more than one manufacturer. Some artisans have resorted to individually measuring each of their prisms to determine the offset of each. Unfortunately, this is a costly procedure and is often impossible because many prisms are hermetically sealed in their housings. Even with prisms made by the same manufacturer, accumulated manufacturing tolerances in prism housings, mountings, and other mechanical components can introduce significant offset discrepancies from prism to prism and from mounting to mounting.

Hence, there is a need for methods and apparatuses for positioning a corner-cube prism or other retroreflector relative to the target axis so as to allow the prism to produce a reflected beam that is parallel to an incident beam, even when the incident beam is not parallel to the optical axis of the prism.

There is also a need for such methods and apparatuses that are easily and conveniently usable in the field.

There is also a need for retroreflector apparatuses that can be set up at a location remote from a source of electromagnetic radiation, such as an EDM, and that will produce a reflected beam from an incident beam, transmitted to the prism from the source, that is exactly parallel to the incident beam, even when the face of the prism is not exactly perpendicular to the incident beam.

There is also a need for prism-mounting apparatuses that allow prisms from various manufacturers and of different diameters to be interchangeably used without generating discrepancies in distance measurements.

SUMMARY OF THE INVENTION

The foregoing needs are met by the present invention which encompasses novel methods for setting the nodal point of a corner-cube prism or other retroreflector having a nodal point, as well as apparatuses particularly adapted for performing the method.

Apparatuses for performing such a method allow the following motions of the retroreflector: (a) rotation about a stationary first pivot axis, and (b) motion along the optical axis of the retroreflector relative to the first pivot axis. The apparatuses can be adapted to allow the retroreflector to be also pivoted about one or more additional pivot axes. As used herein, the "optical axis" of a retroreflector such as a corner-cube prism is the longitudinal axis thereof that passes through the prism face. A "pivot axis" is perpendicular to the optical axis and is an axis about which the retroreflector is rotatable for aligning the retroreflector to reflect a beam of light or other electromagnetic radiation, transmitted by a source to the retroreflector, back to the source. Although the pivot axis is preferably vertical, it can have any other orientation perpendicular to the optical axis.

Methods according to the present invention comprise producing a reflected image, using the retroreflector, of a stationary reference object; and pivoting the retroreflector about a stationary pivot axis and moving (displacing) the retroreflector along its optical axis to a position at which the reflected image remains stationary as the retroreflector is pivoted about the pivot axis. The reference object can be any stationary object or source of electromagnetic radiation of which the retroreflector can produce a reflected image.

The present invention also encompasses methods for producing a reflected beam of electromagnetic radiation, from an incident beam transmitted by a remote source, that returns to the source parallel to the incident beam. In such methods, a corner-cube prism or other retroreflector is provided and mounted on a stationary support allowing the prism to undergo the above-described motion about a pivot axis and its optical axis. After the nodal point of the prism has been set, the prism is oriented toward the source so as to produce the reflected beam.

After setting the nodal point of a corner-cube prism or other retroreflector according to the present invention, an incident beam of electromagnetic radiation, transmitted by a remote source to the prism, will enter the prism face and be reflected by the prism exactly parallel to the incident beam, even when the optical axis of the prism is not parallel with the propagation vector of the incident beam. Thus, it is no longer necessary to perform the extremely delicate alignments of the corner-cube prism with the source that were previously required to ensure a reflected beam returned exactly to the source.

Preferred embodiments of apparatuses according to the present invention comprise at least a prism mounting adapted to be pivoted about a first pivot axis and a corner-cube prism (or other retroreflector) affixed to the prism mounting such that the optical axis is perpendicular to the pivot axis and the prism is movable along the optical axis. The prism mounting preferably comprises a frame pivotable about the pivot axis and a housing mounted to the frame, wherein the prism is mountable to the housing.

The prism mounting can comprise a barrel mounted to the frame, with a prism mounting block disposed inside the barrel. The barrel has a barrel axis that is perpendicular to the pivot axis. The prism mounting block is coaxial with the barrel axis and allows the prism to be mounted such that the optical axis is coincident with barrel axis. Moving the prism mounting block along the barrel axis moves the prism along its optical axis.

Apparatuses according to the present invention also encompass a corner-cube prism or other retroreflector having a nodal point and an optical axis, wherein the prism is pivotable about a pivot axis that extends through the nodal point.

Apparatuses according to the present invention can also have additional features to facilitate: (a) mounting to a tripod, prism pole, or other stationary support; (b) ease of moving the prism along the optical axis; (c) cinching means for preserving nodal point settings; (d) provision of a stationary reference object for viewing while setting the nodal point; (e) means for aligning a source of electromagnetic radiation with the prism, such as by providing targeting lines; (f) and stacking of multiple retroreflector assemblies.

DETAILED DESCRIPTION

I have discovered that a corner-cube prism or analogous retroreflector as described above, even though the prism has planar surfaces and no focal point, indeed has a nodal point. The following terms are useful in understanding the nodal point of a corner-cube prism or other retroreflector: the "optical axis" is the longitudinal axis of the prism that passes through the prism apex and through the center of the prism face. A particular prism has only one optical axis. A "pivot axis" is any axis, perpendicular to the optical axis, about which the prism is rotatable in an effort to align the prism so as to reflect a beam of light or other electromagnetic radiation, transmitted from a source to the prism, back to the source. (In conventional uses of a corner-cube prism, such as for surveying, the source is an EDM that transmits pulses of infrared light.) An "incident beam" is transmitted by the source and passes through the prism face to the interior of the prism. Total internal reflection of the incident beam by the prism generates a corresponding "reflected beam" that exits the prism through the prism face. The "nodal point" of a corner-cube prism is a fixed point inside the prism representing the intersection of the optical axis with a pivot axis about which the prism can be rotated without loss of parallelism of a reflected beam relative to the corresponding incident beam. In other words, the nodal point is a locus on the optical axis representing the optical center of the prism, at which locus all internal rays intersect the optical axis. Accordingly, a "nodal point pivot axis" is any pivot axis that intersects the optical axis at the nodal point of the prism.

I have further discovered a simple method of "setting the nodal point" of a corner-cube prism. The method is very simple to perform, even in the field. It is also easy to learn, even by unskilled personnel.

Before describing the method in detail, preferred embodiments of apparatuses according to the present invention will be described.

Preferred Apparatus Embodiments

Figure 1:
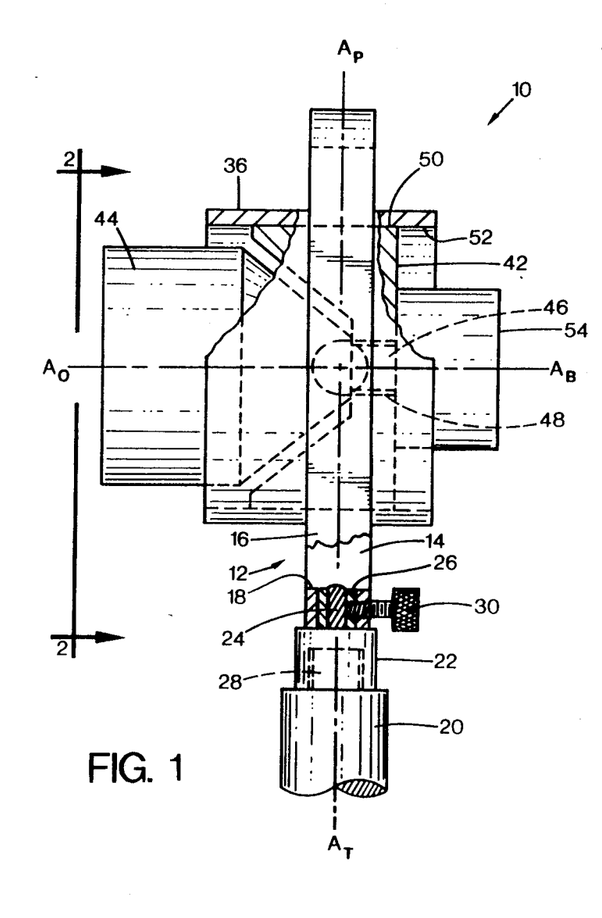
FIG. 1 is a side elevational view of one embodiment of a retroreflector apparatus according to the present invention.
Figure 2:
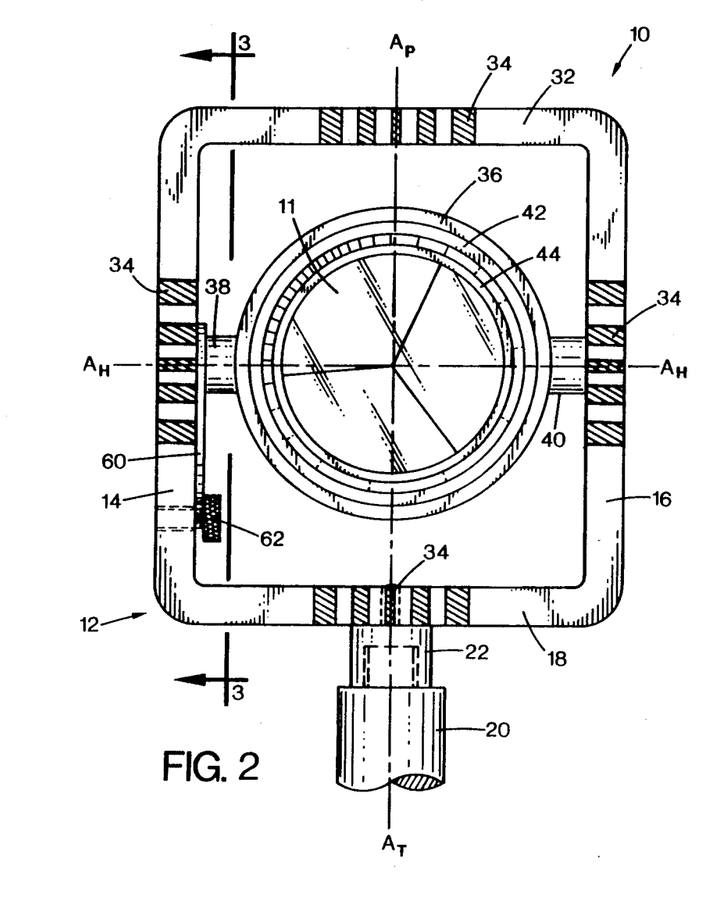
FIG. 2 is a front elevational view of the FIG. 1 embodiment.
Figure 3:
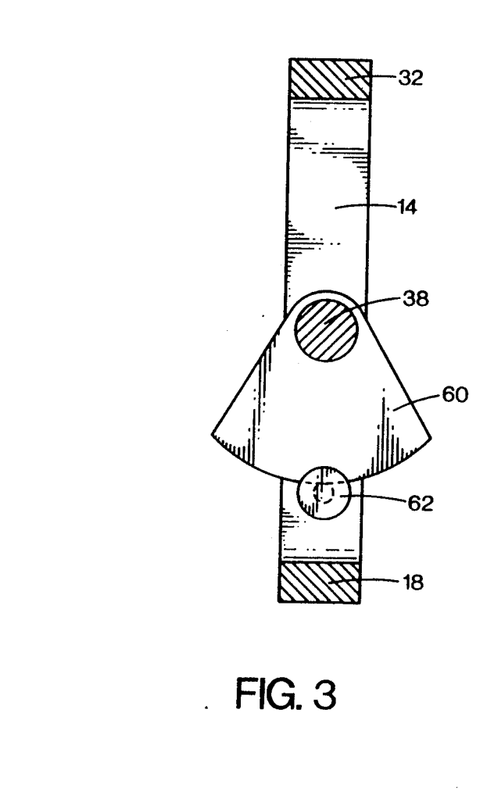
FIG. 3 is a vertical section of the FIG. 2 embodiment.

General features of a preferred embodiment of a retroreflector assembly 10 according to the present invention and particularly adapted for surveying use are shown in FIGS. 1-3. Such a retroreflector assembly 10 comprises a corner-cube prism 11 or other retroreflector mounted such that: (a) the prism 11 is rotatable about a first pivot axis $A_P$; and (b) the prism 11 is movable along its optical axis $A_O$ relative to the first pivot axis $A_P$. Also included within the scope of the present invention are retroreflectors each comprising a corner-cube prism pivotable about its nodal point pivot axis.

In FIG. 1, a target axis $A_T$ is shown. As discussed above, the target axis $A_T$ is the normally vertically oriented longitudinal axis of the tripod, prism pole, or analogous stationary support, and passes through a point on the earth having a distance from the EDM that is to be measured. Although the first pivot axis $A_P$ is shown to be vertical and coincident with $A_T$, the first pivot axis $A_P$ can, in general, be coplanar with the target axis $A_T$. Thus, the first pivot axis $A_P$ need not be vertical. (However, it is most convenient with retroreflector assemblies used for surveying applications that the first pivot axis $A_P$ be vertical and coincident with $A_T$.)

Referring further to FIG. 1 and also to FIG. 2, a retroreflector assembly 10 for surveying use comprises a frame 12 preferably constructed of a rigid material such as plastic or metal. The frame 12 is attachable to a stationary prism pole 20, tripod, or analogous support in a manner allowing the frame 12 to be pivoted about the first pivot axis $A_P$. Thus, the frame 12 serves to securely mount the prism 11 to the prism pole 20 or analogous support. The frame 12 preferably comprises first and second vertical members 14, 16 coupled to at least a first horizontal member 18. In the embodiment of FIGS. 1-2, the first pivot axis $A_P$ extends transversely through the middle of the first horizontal member 18.

For attachment of the frame 12 to the prism pole 20, tripod, or other stationary support, a mounting pad 22 is provided. In the embodiment of FIGS. 1 and 2, the mounting pad 22 comprises a cylindrical male end 24 extending into a bearing member 26 embedded in the first horizontal member 18 coaxially with the first pivot axis $A_P$. The bearing member 26 is adapted to allow rotation of the frame 12 about the male end 24 (and, therefore, the first pivot axis $A_P$) while the frame 12 is supported by the mounting pad 22. The mounting pad 22 also defines a female threaded aperture 28, located opposite the male end 24, adapted to be threaded onto a captive male threaded stud normally provided on conventional prism poles 20, tripods, and analogous supports. If desired for added precision in aligning the retroreflector assembly 10, the frame 12 can be attached via the mounting pad 22 to a conventional tribach assembly (not shown) which, in turn, is mounted to a tripod or the like. The bearing member 26 preferably includes a locking screw 30 or analogous device engageable against the male end 24 of the mounting pad 22 to enable the user to "lock" the rotational position of the retroreflector assembly on the first pivot axis $A_P$. Also, the mounting pad exterior can be knurled, ribbed, provided with wrench flats, or otherwise adapted (not shown) to facilitate threading and tightening onto the male stud.

Referring now to FIG. 2, the frame 12 can also define a second pivot axis, such as a horizontal axis $A_H$ passing through the first and second vertical members 14, 16. (It is preferred, particularly for surveying applications, that the second pivot axis $A_H$ be horizontal. However, in general, methods and apparatuses according to the present invention are not dependent upon a second pivot axis being provided or upon the second pivot axis, if provided, being horizontal.) The second pivot axis $A_H$ intersects and is perpendicular to the optical axis $A_O$. Also, the second pivot axis $A_H$ and the first pivot axis $A_P$ are at least coplanar (and preferably perpendicular to each other); i.e., they both intersect the optical axis $A_O$ the same locus. The second pivot axis $A_H$ facilitates alignment of the prism 11 with a light source such as an EDM.

For additional rigidity, the frame 12 also preferably includes a second horizontal member 32 coupled to the vertical members 14, 16 opposite the first horizontal member 18. The horizontal and vertical members are preferably conjoined end-to-end at right angles so as to form a substantially rectangular frame 12 in surrounding relationship to the barrel 36.

Referring to FIG. 2, the frame 12 also preferably includes a symmetric array of indexing aids 34. The indexing aids 34 preferably have a highly visible color such as fluorescent green or red, to permit good visibility at long distances using a theodolite. According to the embodiment shown in FIG. 2, each indexing aid 34 is configured as an arrangement of plural lines wherein inner lines are narrower than outer lines, thereby ensuring that at least some of the lines are visible using a theodolite at various distances away. As an example of an alternative embodiment, the array of lines comprising each indexing aid shown in FIG. 2 can be replaced with a single triangular shape having an apex oriented toward the prism. Of course, other indexing aid patterns are possible and it is within the purview of one skilled in the art to select a particular indexing aid pattern best suited for the intended application of the retroreflector apparatus 10.

Referring further to the embodiment of FIGS. 1 and 2, a cylindrical barrel 36 is mounted equidistantly between the first and second vertical portions 14, 16 by first and second mounting posts 38, 40, or analogous mounting means, rigidly affixed to the barrel 36. The mounting posts 38, 40 permit the barrel 36 to be pivoted relative to the frame 12 about the horizontal axis $A_H$. The barrel has a barrel axis $A_B$. The barrel 36 serves as a housing which surrounds the prism 11 (FIG. 2) and facilitates movement of the prism 11 along its optical axis $A_O$.

A prism mounting plate 42 is disposed inside the barrel 36 coaxially with the barrel axis $A_B$. The prism mounting plate 42 is adapted for mounting a conventional corner-cube prism 11 thereto. (As shown in FIGS. 1-2, a conventional corner-cube prism 11 is encased in a canister 44 to protect the prism 11. Such a canister 44 is typically equipped with a rearwardly projecting male mounting stud 46.) The prism mounting plate 42 coaxially defines a female threaded aperture 48 to receive the mounting stud 46. Thus, when the prism canister 44 is mounted to the prism mounting plate 42, the optical axis $A_O$ of the prism 11 coincides with the barrel axis $A_B$.

The prism mounting plate 42 is movable relative to the barrel 36 along the barrel axis $A_B$, thereby permitting movement of the corner-cube prism 11 along its optical axis $A_O$ relative to the first pivot axis $A_P$. Such movement permits the nodal point (not shown) of the prism 11 to be positionally adjusted relative to the first pivot axis $A_P$. It will be appreciated that the retroreflector assembly 10 can include any of various mechanisms adapted to effect such adjustability of the prism mounting plate 42 relative to the barrel 36.

In a first possible embodiment (not shown), a rack gear can be affixed to the prism mounting plate, wherein the rack gear engages a pinion gear rotatably mounted to the barrel. A user would turn the pinion to positionally adjust the prism mounting plate (with prism attached) relative to the barrel in a manner similar to the focusing mechanism on a microscope.

In a second possible embodiment (not shown), a male screw thread can be provided on the outside diameter of the prism mounting plate. A mating female thread provided on the inside diameter of the barrel would allow the prism mounting plate to be threaded into the barrel. Thus, the user would rotate the prism mounting plate relative to the barrel so as to positionally adjust the prism mounting plate (with prism attached) relative to the barrel.

In yet another embodiment, as shown in FIGS. 1-2, the prism mounting plate 42 has an outside diameter 50 permitting the prism mounting plate 42 to slip-fit the inside diameter 52 of the barrel 36. Such a slip fit preferably has sufficient friction to prevent the prism mounting plate 42 from unintentionally shifting position after adjustment is completed but not so much friction that movement of the prism mounting plate 4 is difficult to perform. To facilitate moving the prism mounting plate 42 (with prism canister 44 attached) along the barrel axis $A_B$, the prism mounting plate 42 can include a rearward protrusion 54 adapted to be grasped by the user. The rearward protrusion 54 can be knurled or the like for ease of grasping.

Referring now to the embodiment of FIGS. 1 and 3, a wedge-shaped fin 60 is affixed to the mounting post 38. As the barrel 36 is rotated about the second pivot axis $A_H$, the fin 60 also rotates. A knurled screw 62 threaded into the vertical member 14 can be tightened so as to engage the fin 60, thereby conveniently cinching the barrel (and, therefore, the prism 11) at a particular angular orientation on the second pivot axis $A_H$. The fin 60 can also be provided with index marks (not shown) indicating the angular tilt of the prism about the second pivot axis $A_H$.

Figure 4:
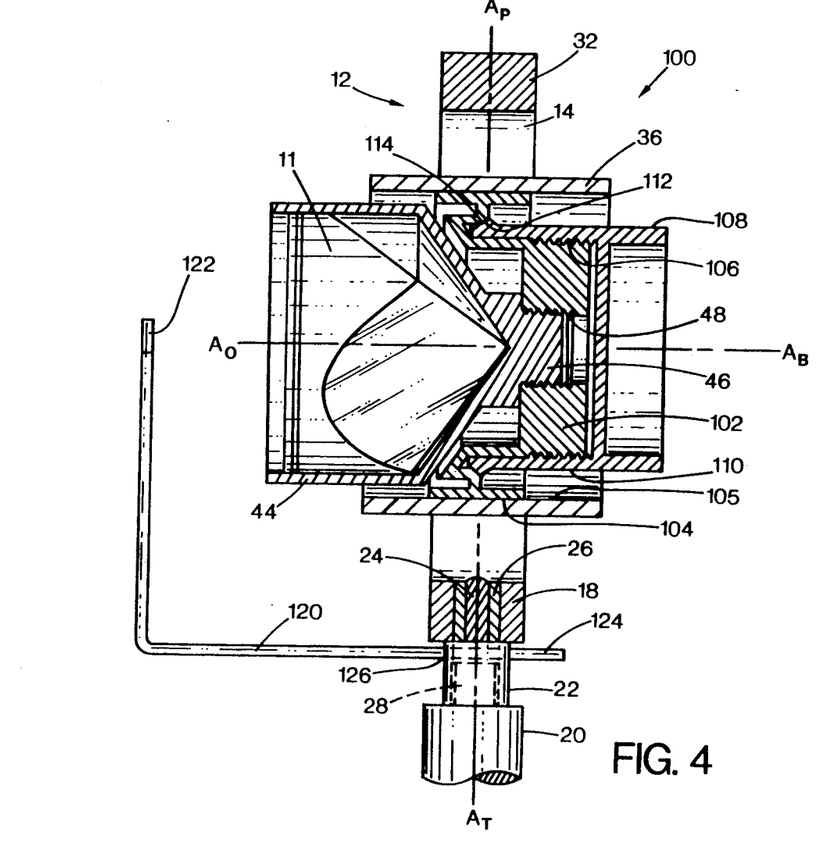
FIG. 4 is a vertical sectional view of an alternative embodiment of a retroreflector assembly according to the present invention.

FIG. 4 shows an alternative embodiment of a retroreflector assembly 100 according to the present invention. The FIG. 4 embodiment has a number of features identical to the embodiment of FIGS. 1 and 2, which have the same reference designators. The FIG. 4 embodiment includes a target axis $A_T$ and a first pivot axis $A_P$. The FIG. 4 embodiment also includes a corner-cube prism 11 mounted in a canister 44. The canister 44 includes a rearwardly projecting male stud 46 threaded into a female threaded aperture 48 coaxially defined by a prism mounting plate 102. The prism mounting plate 102 has an outside diameter 104 adapted to slip-fit the inside diameter 105 of a barrel 36. The barrel 36 is pivotably mounted to the frame 12, similar to the embodiment of FIGS. 1 and 2. The prism mounting plate 102 has a threaded portion 106 on which is threaded a nut 108.

The nut 108 comprises a cylindrical portion 110 coaxially oriented toward the prism 11. An annular ramp 112 is provided on the outside of the cylindrical portion 110 that engages a mating circumferential ramp 114 on the prism mounting plate 102. As the nut 108 is rotated in a "tighten" direction relative to the prism mounting plate 102, the annular ramp 112 engaging the mating circumferential ramp 114 causes the circumferential ramp 114 to radially expand, thereby increasing the friction with which the outside diameter 104 of the prism mounting plate engages the inside diameter 105 of the barrel. Thus, the user can "lock" the prism mounting plate 102 in a desired position along the optical axis $A_O$ (and barrel axis $A_B$). Preferably, the prism mounting plate 102 is provided with a keyway or other anti-rotation means (not shown), which prevents rotation of the prism mounting plate 102 (and, therefore, the prism 11) relative to the barrel 36 whenever the nut 108 is being tightened or loosened.

Another possible means (not shown) for locking the prism mounting plate in a desired position along the barrel axis $A_B$ (and optical axis $A_O$) would comprise a screw threaded through the wall of the barrel 36 so as to press against the outside diameter of the prism mounting plate whenever the screw is tightened.

Other alternative embodiments of mechanisms for positionally adjusting the prism mounting plate (with prism attached) are within the purview of persons skilled in the art and will not be described further.

Preferred embodiments of retroreflector assemblies according to the present invention include a stationary reference object. A reference object produces a reflected image of itself in the corner-cube prism and is used for adjusting the nodal point of the corner cube prism, as described in further detail below. As shown in FIG. 4, a preferred embodiment of a reference object comprises an L-shaped rod 120 having a highlighted first end 122 (such as by painting the first end 122 with fluorescent-red paint). The second end 124 is adapted to be affixed to the mounting pad 22; to a prism pole 20, tripod, or the like; or to any other stationary support. For example, as shown in FIG. 4, the mounting pad 22 defines an aperture 126 therethrough adapted for receiving the second end 124 of the reference object inserted therein. Although not shown in FIG. 4, the mounting pad can include a lock screw or analogous device for ensuring that the reference object remains absolutely stationary during use.

In addition to the features described hereinabove, the frame 12 can also include means for fastening multiple frames together edgewise. Such means would include, but not be limited to, screws or clamps. Thus, multi-prism assemblies can be constructed for use when measuring particularly long distances where multiple retroreflectors serve to increase the intensity of pulsed-coherent light returning to the EDM.

Nodal Point Setting Method

According to the present invention, a corner-cube prism or other retroreflector can be accurately and easily positioned while mounted on a tripod, prism pole, or analogous support so as to allow the prism to be rotated about a pivot axis without loss of parallelism of a reflected beam relative to the corresponding incident beam, even when the incident beam is not parallel to the optical axis of the prism. This is accomplished by moving the prism along its optical axis $A_O$, as described below, until the pivot axis intersects the nodal point of the prism. Such alignment of the nodal point with the pivot axis is termed "setting the nodal point." Because the nodal point is "set" optically, rather than mechanically, mathematically, or by dimensional measurement, manufacturing tolerances and other sources of mechanical error in the corner-cube prism are automatically corrected. Thus, the method works even when corner-cube prisms from different manufacturers and having different "offsets" are being used.

The method is most conveniently performed by mounting the prism or other retroreflector in an apparatus as described above and shown for example in FIGS. 1-4. Such an apparatus allows the prism to be manipulated in the following ways: (a) a reciprocative pivoting motion of the prism about a stationary pivot axis; and (b) motion of the prism along its optical axis toward and away from the pivot axis. No other motions of the prism are necessary for setting the nodal point.

Virtually all corner-cube prisms currently available are contained within a protective housing ("canister") rearwardly provided with a threaded stud adapted for mounting the housing to a frame or panel found on conventional retroreflector assemblies. When using an apparatus according to the present invention as described above, the stud should be threaded finger-tight into the female threaded aperture in the prism mounting plate. The frame should be firmly mounted on a tripod, surveyor's pole, or analogous support by threading the mounting pad onto a male threaded stud normally on such a support. It is unnecessary that the tripod or prism pole be placed in alignment with an actual target axis when setting the nodal point. In any event, the tripod or prism pole should be stationary to ensure that the pivot axis is stationary while setting the nodal point.

A suitable reference object can be any stationary object observable as an image reflected by the prism. For example, the reference object can be the viewer's own face. Alternatively, the reference object can comprise a highlighted end of a stationary rod, as described above.

According to one method of performing the nodal point adjustment according to the present invention, the user views the image of the reference object, as reflected by the corner-cube prism, while pivoting the retroreflector assembly about a stationary pivot axis. Such pivoting is preferably reciprocative (back and forth) to better enable the user with unaided eye to discern subtle motions of the image as the prism is pivoted. Whenever the nodal point is improperly set (i.e., is not located on the pivot axis), the reflected image of the reference object will be observed to synchronously shift position as the retroreflector assembly is pivoted about the pivot axis. To change the magnitude of this shifting motion, the prism is moved along its optical axis. Movement of the prism along its optical axis is continued until the reflected image of the reference object is observed to remain absolutely stationary as the retroreflector assembly is pivoted about the pivot axis. When the image remains stationary, the nodal point of the prism is situated on the pivot axis and is thereby properly "set."

It is, of course, within the scope of the present invention to "view" the reflected image of the reference object using optical position sensing equipment, such as a video camera, photosensor array, or analogous means. Use of such equipment can permit extremely accurate settings of nodal points according to the present invention.

On multiple retroreflector assemblies, the procedure described above is repeated for each prism until the nodal point of all the prisms has been set.

Once the nodal point of a prism has been set, it is usually not necessary to readjust the nodal point unless the retroreflector assembly has been handled roughly or the setting has been otherwise changed. In any event, rechecking the nodal point setting before each use of the retroreflector assembly is easily and quickly performed by observing a reflected image of a stationary object and confirming that the image does not shift back and forth as the corner-cube prism is reciprocatively pivoted about the pivot axis, as described above.

Also, once the nodal point has been set, the retroreflector assembly is ready to be aligned with an EDM or other source of electromagnetic radiation. Setting the nodal point as described above makes such alignment much easier to perform in the field, since it is no longer necessary to have the optical axis of the corner-cube prism oriented exactly coincident (or at least parallel) with the propagation vector of the pulsed light beam to ensure that the beam will be reflected back to the EDM.

I have found that a person skilled in performing this method can repeatedly adjust the nodal point to an accuracy of about +/−0.5 mm, even when using his face (which is difficult to hold absolutely still) as the reference object. It will be apparent to persons skilled in the art that this procedure can also be performed even more accurately using a coherent light beam from a stationary source as the "reference object," wherein one adjusts the axial position of the corner-cube prism along the barrel axis until no discernable shift of the reflected beam occurs.

I have also found that, once the nodal point of a corner-cube prism has been adjusted as described above, the prism will be "offset" a certain distance from the target axis. Assuming all corner-cube prisms are made from a cylindrical piece of optical glass with a circular planar face and an opposing three-sided pyramidal end, as described above, the amount of offset will depend upon the face diameter of the prism (assuming the prism facets among the different prisms have the same angular orientation). Most corner-cube prisms in current use have a face diameter within the range of about 62 to 63.5 mm. I have found that the offset, after adjusting the nodal point, of these prisms is about −42 mm. Prisms having other diameters will have different "offsets." Modern EDM instruments are capable of incorporating such offset values into their distance calculations, wherein the user "programs" the offset value into the computational electronics of the EDM.

Having illustrated and described the principles of my invention in a preferred embodiment and variations thereof, it should be apparent to those skilled in the art that the present invention can be modified in arrangement and detail without departing from the principle thereof. I claim as my invention all modifications coming within the scope and spirit of the following claims:

I claim:

1. A method for setting the nodal point of a retroreflector having a face and an optical axis, the method comprising:
    (a) viewing into the face of the retroreflector so as to observe a reflected image, produced by the retroreflector, of a stationary reference object;
    (b) while viewing the reflected image, pivoting the retroreflector about a stationary pivot axis perpendicular to the optical axis; and
    (c) while performing step (b), moving the retroreflector along its optical axis to a position at which the reflected image of the reference object remains stationary as the retroreflector is pivoted about the pivot axis.

2. A method as recited in claim i wherein step (b) comprises reciprocatively pivoting the retroreflector about the pivot axis.

3. A method as recited in claim 1 wherein step (b) comprises pivoting the retroreflector about a vertical pivot axis.

4. A method for setting the nodal point of a corner-cube prism having a face and an optical axis, the method comprising:
    (a) providing a stationary reference object;
    (b) orienting the prism such that the prism produces a reflected image of the reference object as viewed through the face of the prism;
    (c) while orienting the prism as recited in step (b), reciprocatively pivoting the prism about a stationary pivot axis perpendicular to the optical axis; and
    (d) while reciprocatively pivoting the prism about the pivot axis, displacing the prism along its optical axis until the reflected image of the reference object remains stationary as the prism is pivoted about the pivot axis.

5. A method for setting the nodal point of a corner-cube prism having a face and an optical axis, the method comprising:
    (a) directing an incident light beam, transmitted by a stationary source, at the face of the corner-cube prism so as to produce a reflected beam;
    (b) while producing the reflected beam, pivoting the prism about a stationary pivot axis perpendicular to the optical axis; and
    (c) while pivoting the prism about the pivot axis, displacing the prism along its optical axis until the reflected beam remains stationary as the prism is pivoted about the pivot axis.

6. A method as recited in claim 5 wherein step (b) comprises reciprocatively pivoting the prism about the pivot axis.

7. A method for setting the nodal point of a corner-cube prism having a face and an optical axis, the method comprising:
    (a) placing a stationary reference object before the face of the prism so as to cause a reflected image of the reference object to be produced by the prism;
    (b) observing the reflected image while reciprocatively pivoting the prism about a stationary pivot axis perpendicular to the optical axis, and
    (c) simultaneously with step (b), displacing the prism along its optical axis until the reflected image is observed to remain stationary as the prism is pivoted about the pivot axis.

8. A method for producing a reflected beam of electromagnetic radiation, from an incident beam transmitted by a remote source, that returns to the source parallel to the incident beam, the method comprising:
    (a) providing a corner-cube prism having a face and an optical axis;
    (b) mounting the prism on a stationary support allowing the prism to be pivoted about a pivot axis perpendicular to the optical axis;
    (c) providing a stationary reference object;
    (d) orienting the prism to produce a reflected image of the reference object as viewed through the face of the prism;
    (e) while orienting the prism as recited in step (d), reciprocatively pivoting the prism about the pivot axis;
    (f) while reciprocatively pivoting the prism about the pivot axis, displacing the prism along its optical axis until the reflected image of the reference object remains stationary as the prism is pivoted about the pivot axis; and
    (g) orienting the face of the prism toward the source to allow the prism to produce a reflected beam, from an incident beam transmitted by the source, that returns to the source.

9. A retroreflector comprising a corner cube prism having an optical axis and a nodal point, the prism being pivotable about a pivot axis that is alignable with a target axis and that intersects the optical axis, and being movable along the optical axis a distance sufficient to allow alignment of the nodal point with the pivot axis.

10. A retroreflector as recited in claim 9 further comprising a frame to which the corner cube prism is mounted so as to allow the prism to be pivoted about the pivot axis.

11. A retroreflector as recited in claim 10 further comprising:
    (a) a bearing member affixed to the frame coaxially with the pivot axis; and
    (b) a mounting pd adapted to be affixed to a support and adapted to detachably engage the bearing member coaxially with the pivot axis so as to allow the frame and bearing member to be pivoted about the pivot axis relative to the mounting pad and the support.

12. An apparatus for setting the nodal point of corner-cube prism having an optical axis, the apparatus comprising:
    (a) a frame mountable to a support so as to be pivotable about a stationary pivot axis;
    (b) a prism mounting comprising (i) a barrel mounted to the frame, the barrel having a barrel axis that intersects the pivot axis, and (ii) a prism mounting block disposed in the barrel and adapted to be moved in the barrel along said barrel axis, to which prism mounting block a corner-cube prism is mountable such that the optical axis of the prism coincides with the barrel axis, thereby allowing the prism to be moved along the optical axis relative to the pivot; and
    (c) a reference object mountable to a stationary support.

13. An apparatus as recited in claim 12 wherein the frame includes an indexing aid.

14. An apparatus for producing, from an incident beam of electromagnetic radiation transmitted by a source, a reflected beam that returns to the source, the apparatus comprising:
    (a) a retroreflector having an optical axis and a nodal point;
    (b) first pivot means for reciprocatively pivoting the retroreflector about a stationary first pivot axis perpendicular to the optical axis; and
    (c) displacement means for moving the retroreflector along the optical axis relative to the first pivot axis so as to allow alignment of the nodal point with the first pivot axis.

15. An apparatus as recited in claim 14 wherein the retroreflector comprises a corner-cube prism.

16. An apparatus as recited in claim 15 wherein said first pivot means comprises means for reciprocatively pivoting the retroreflector about the first pivot axis.

17. An apparatus as recited in claim 14 further comprising second pivot means for pivoting the retroreflector about a second pivot axis coplanar with the first pivot axis.

18. An apparatus as recited in claim 17 wherein said second pivot means comprises cinching means for holding the retroreflector at an angular orientation about the second pivot axis relative to said first pivot means.

* * * * *

UNITED STATES PATENT AND TRADEMARK OFFICE
CERTIFICATE OF CORRECTION

PATENT NO. : 5,231,539
DATED : July 27, 1993
INVENTOR(S) : David A. MCMillen

It is certified that error appears in the above-indentified patent and that said Letters Patent is hereby corrected as shown below:

Column 1, lines 7-8, "systems elements" should be --systems and elements--;

Column 1, line 11, "back the instruments" should be --back to the instruments--;

Column 5, line 50, "optical center" should be --<u>optical center</u>--;

Column 8, line 21, "4" should be --42--;

<u>In the Claims:</u>

Column 11, line 63, "claim i" should be --claim 1--; and

Column 13, line 17, "pd" should be --pad--.

Signed and Sealed this

Twenty-seventh Day of September, 1994

Attest:

BRUCE LEHMAN

Attesting Officer     Commissioner of Patents and Trademarks